US011781646B2

(12) United States Patent
Song et al.

(10) Patent No.: US 11,781,646 B2
(45) Date of Patent: Oct. 10, 2023

(54) SPHERE-TYPE SHIFT CONTROL APPARATUS FOR ELECTRONIC TRANSMISSION SYSTEM

(71) Applicants: Hyundai Motor Company, Seoul (KR); Kia Motors Corporation, Seoul (KR)

(72) Inventors: Ki Young Song, Gyeonggi-do (KR); Jae Hyeong Cho, Gyeonggi-do (KR); Yeon Ji Kang, Gyeonggi-do (KR); Pill Yoon Kim, Gyeonggi-do (KR); Jae Min Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 239 days.

(21) Appl. No.: 17/015,701

(22) Filed: Sep. 9, 2020

(65) Prior Publication Data
US 2021/0356037 A1    Nov. 18, 2021

(30) Foreign Application Priority Data
May 13, 2020 (KR) .................. 10-2020-0057086

(51) Int. Cl.
*F16H 59/12* (2006.01)
*F16H 59/08* (2006.01)

(52) U.S. Cl.
CPC ....... *F16H 59/12* (2013.01); *F16H 2059/081* (2013.01)

(58) Field of Classification Search
CPC ............ F16H 59/12; F16H 2059/0291; F16H 59/0278; F16H 59/02; G05G 1/105; G05G 1/02; G05G 1/087
See application file for complete search history.

(56) References Cited

U.S. PATENT DOCUMENTS

| 6,144,370 A | 11/2000 | Eleyan et al. |
| 7,965,282 B2 | 6/2011 | Yamada |
| 9,303,755 B2 * | 4/2016 | Kim ........................ F16H 59/10 |
| (Continued) | | |

FOREIGN PATENT DOCUMENTS

| JP | 2002-337715 A | 11/2002 |
| JP | 2014-156153 A | 8/2014 |
| (Continued) | | |

OTHER PUBLICATIONS

"FAQ: What are Hall effect sensors and what is their role in DC Motors", (Jan. 11, 2017), Motion Control Tips (Year: 2017).*
Non-Final OA dated Dec. 15, 2022 in U.S. Appl. No. 17/399,366.

*Primary Examiner* — Gregory Robert Weber
(74) *Attorney, Agent, or Firm* — Fox Rothschild LLP

(57) ABSTRACT

A sphere-type shift control apparatus for an electronic transmission system includes a shift operation unit configured to be operated by a driver of a vehicle for gear shifting on a first hemisphere of a spherical mechanism and a design unit for indirect illumination and image transmission on a second hemisphere of the spherical mechanism. By rotating the spherical mechanism, only the shift operation unit is exposed to a vehicle interior through an opening of a housing when a shift operation is required, while only the design unit is exposed to the vehicle interior through the opening of the housing when the shift operation is not required.

12 Claims, 9 Drawing Sheets

(56) References Cited

U.S. PATENT DOCUMENTS

| | | | |
|---|---|---|---|
| 9,322,469 B2* | 4/2016 | Kim | F16H 59/08 |
| 10,364,883 B2* | 7/2019 | Kim | F16H 59/0204 |
| 2006/0096406 A1* | 5/2006 | Liu | F16H 59/0278 |
| | | | 74/543 |
| 2015/0107393 A1 | 4/2015 | Kim et al. | |
| 2017/0227118 A1* | 8/2017 | Buttolo | F16H 59/0217 |
| 2017/0227119 A1* | 8/2017 | Buttolo | B60K 20/08 |
| 2019/0032772 A1* | 1/2019 | Kim | F16H 59/08 |

FOREIGN PATENT DOCUMENTS

| | | | |
|---|---|---|---|
| KR | 20120001949 A | * | 5/2012 |
| KR | 2019-0050374 A | | 5/2019 |

* cited by examiner

SPHERE-TYPE SHIFT CONTROL APPARATUS FOR ELECTRONIC TRANSMISSION SYSTEM

CROSS REFERENCE TO RELATED APPLICATION

The present application claims under 35 U.S.C. § 119(a) the benefit of Korean Patent Application No. 10-2020-0057086 filed on May 13, 2020, the entire contents of which are incorporated by reference herein.

BACKGROUND

(a) Technical Field

The present disclosure relates to a sphere-type shift control apparatus for an electronic transmission system, more particularly, to the sphere-type shift control apparatus that includes a shift operation unit on a first hemisphere of the shift control apparatus and a design unit for indirect illumination on a second hemisphere of the shift control apparatus, where the shift operation unit and the design unit are configured to be changed in position by rotation through 180 degrees.

(b) Description of the Related Art

In general, a vehicle equipped with an automatic transmission controls hydraulic pressure within a preset shift range according to a driving speed of the vehicle, thereby enabling the transmission to be automatically shifted to a target shift range.

The automatic transmission uses hydraulic circuits, planetary gears, and friction elements to render a gear ratio for gear shifting, and these components are controlled by a transmission control unit (TCU).

Unlike an existing mechanical transmission system, a shift-by-wire (hereinafter, referred to as "SBW") system, which is an electronic transmission system for vehicles, is an electronic transmission system that has no mechanical connection structure, such as a cable, between a transmission and a shift control device (e.g., a lever, a button, or a dial). The shift-by-wire system allows shift control to be electronically performed in such a manner that, when a signal generated at the time of operating the shift control device is transmitted to a transmission control unit (TCU), a transmission actuator (e.g., a shift cable motor or a select cable motor) operates in response to the electronic signal commanded by the TCU to apply or block a hydraulic pressure with respect to a hydraulic circuit for each shift range.

Accordingly, the SBW-based automatic transmission is advantageous in that it is more easily shifted to D, R, Null (Nd or Nr) ranges, etc., by transmitting a driver's shift intention to the TCU as an electrical signal through simple operation of the electronic shift control device. In addition, the SBW-based automatic transmission has the advantage of being able to miniaturize the shift control device and to secure a wide space between driver and passenger seats.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a sphere-type shift control apparatus that includes a shift operation unit on a first hemisphere of the shift control apparatus and a design unit for indirect illumination and image transmission on a second hemisphere of the shift control apparatus, and is configured in such a manner that the shift operation unit is exposed toward a driver of a vehicle when a shift operation is required, the design unit is exposed when the shift operation is not required, and the shift operation unit and the design unit are changed in position by rotation through 180 degrees in order to enhance stability through an improvement in visual recognition and to improve merchantability through high-tech imagery.

In accordance with one aspect of the present disclosure, there is provided a sphere-type shift control apparatus for electronic transmission system that includes a spherical mechanism provided, based on a rotary shaft passing through a center of the spherical mechanism, with a shift operation unit on a first hemisphere of the spherical mechanism and a design unit on a second hemisphere of the spherical mechanism, and a power mechanism configured to rotate the rotary shaft, coupled to the spherical mechanism, relative to a housing, wherein the rotary shaft is rotated by operation of the power mechanism so that one of the shift operation unit and the design unit is exposed to a vehicle interior and another of the shift operation unit and the design unit is kept concealed in the housing.

The shift operation unit may be provided with a gear shift configured to be operated by a driver for gear shifting, and the gear shift may be one of a shift dial, a shift button, or a shift lever.

When the gear shift is either the shift dial or the shift lever, a P-range button may be provided on the gear shift.

The sphere-type shift control apparatus may further include a first printed circuit board (PCB) coupled to the spherical mechanism, wherein the first PCB receives an operation signal from the gear shift and outputs a control signal to a transmission control unit (TCU).

The design unit may include a light source coupled to the first PCB and turned on/off by control of the first PCB, and an illumination window having a specific pattern formed on a surface of the illumination window so as to realize indirect illumination when the light source is turned on.

The design unit may further include a diffusion member coupled to the illumination window to face the light source, the diffusion member being configured to diffuse light from the light source.

The design unit may further include a display configured to transmit a specific image through the illumination window.

The power mechanism may include a motor fixed to the housing, a gear member configured to interconnect the motor and the rotary shaft to transmit power from the motor to the rotary shaft, and a second PCB fixed to the housing to control operation of the motor.

The second PCB may control the motor to be driven when receiving a signal from an input unit, and the signal from the input unit may be one of a vehicle ignition on/off signal, a door open/close signal, a door unlock/lock signal, a driving mode change signal (autonomous driving mode and manual driving mode change signal), or an operation switch on/off signal.

The second PCB may be provided with a hall sensor to detect the rotation of the rotary shaft, and the second PCB may control the driving of the motor based on the signal from the hall sensor.

The spherical mechanism may be configured such that the rotary shaft is rotated by 180 degrees when the power mechanism is operated once, thereby allowing either the shift operation unit or the design unit to be exposed to the vehicle interior.

In accordance with another aspect of the present disclosure, there is provided a sphere-type shift control apparatus for electronic transmission system that includes a spherical mechanism having a rotary shaft coupled through the center thereof, and a housing to which the spherical mechanism is rotatably coupled via the rotary shaft. The spherical mechanism has three planes formed on a surface of the spherical mechanism, the three planes being continuously interconnected, the spherical mechanism includes a gear shift provided on a first plane of the spherical mechanism, the gear shift configured to be operated by a driver of a vehicle for gear shifting, the spherical mechanism includes a light source provided on a second plane of the spherical mechanism to realize indirect illumination, and the spherical mechanism includes a display provided on a third plane of the spherical mechanism to transmit a specific image through an illumination window.

The sphere-type shift control apparatus may further include a first PCB coupled to the spherical mechanism, wherein the first PCB receives an operation signal from the gear shift and outputs a control signal to a transmission control unit (TCU).

The sphere-type shift control apparatus may further include a second PCB coupled to the spherical mechanism, wherein the second PCB controls the light source to be turned on/off and operation of the display.

The gear shift may be one of a shift dial, a shift button, or a shift lever.

The sphere-type shift control apparatus may further include a motor fixed to the housing and connected to the rotary shaft to rotate the rotary shaft, wherein either the first PCB or the second PCB may control the motor to be driven.

The spherical mechanism may be rotated about the rotary shaft by 120 degrees, so that only one of the first to third planes is exposed to a vehicle interior (while the other two are kept concealed in the housing).

As apparent from the above description, the sphere-type shift control apparatus according to the present disclosure is provided such that the shift operation unit configured to be operated by the driver of the vehicle for gear shifting is provided on the first hemisphere of the spherical mechanism and the design unit for indirect illumination and image transmission is provided on the second hemisphere of the spherical mechanism. The sphere-type shift control apparatus is advantageous in that it is possible to enhance stability through an improvement in visual recognition and to improve marketability through high-tech imagery in such a manner that, by rotating the spherical mechanism, only the shift operation unit is exposed to the vehicle interior through the opening of the housing when the shift operation is required, while only the design unit is exposed to the vehicle interior through the opening of the housing when the shift operation is not required.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF PREFERRED EMBODIMENTS

Figure 1:
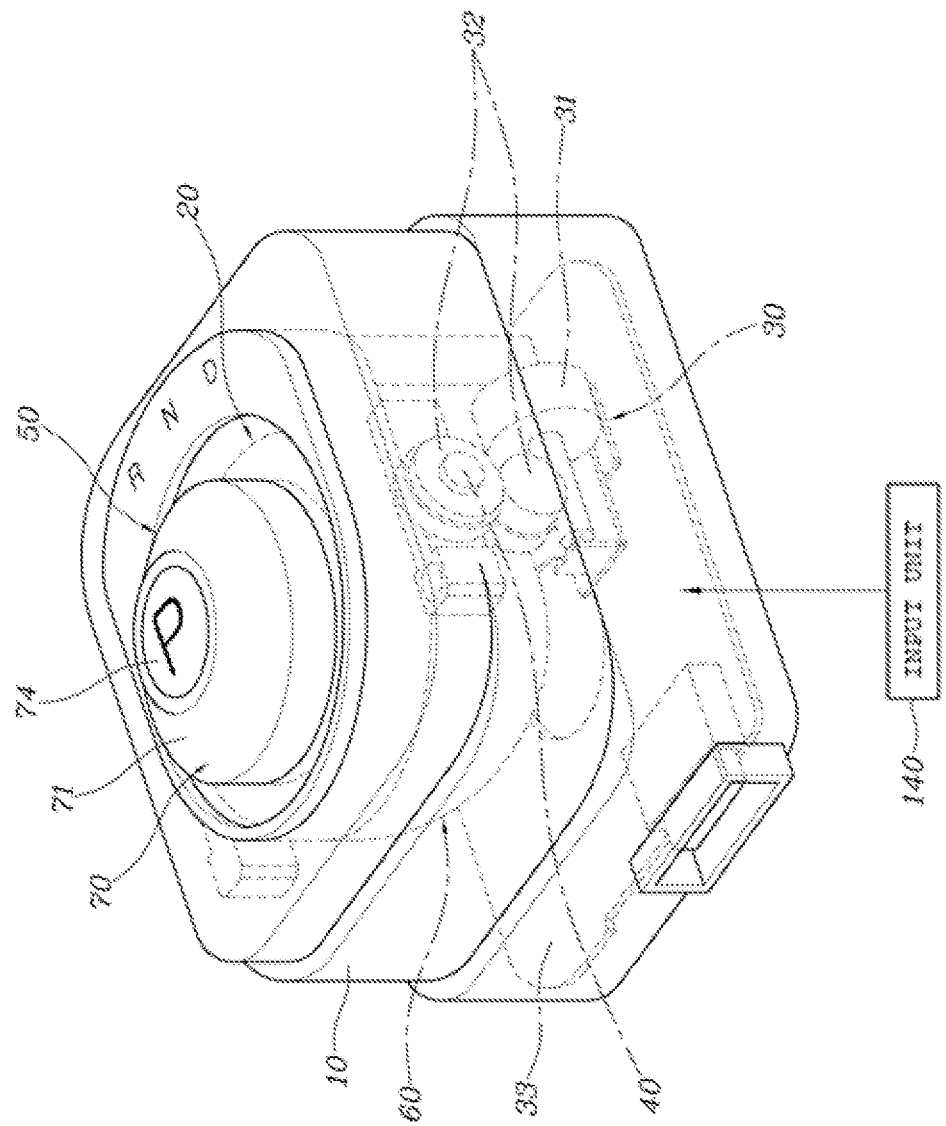
FIGS. 1 and 2 are perspective views illustrating a sphere-type shift control apparatus equipped with a shift dial according to an embodiment of the present disclosure.
Figure 2:
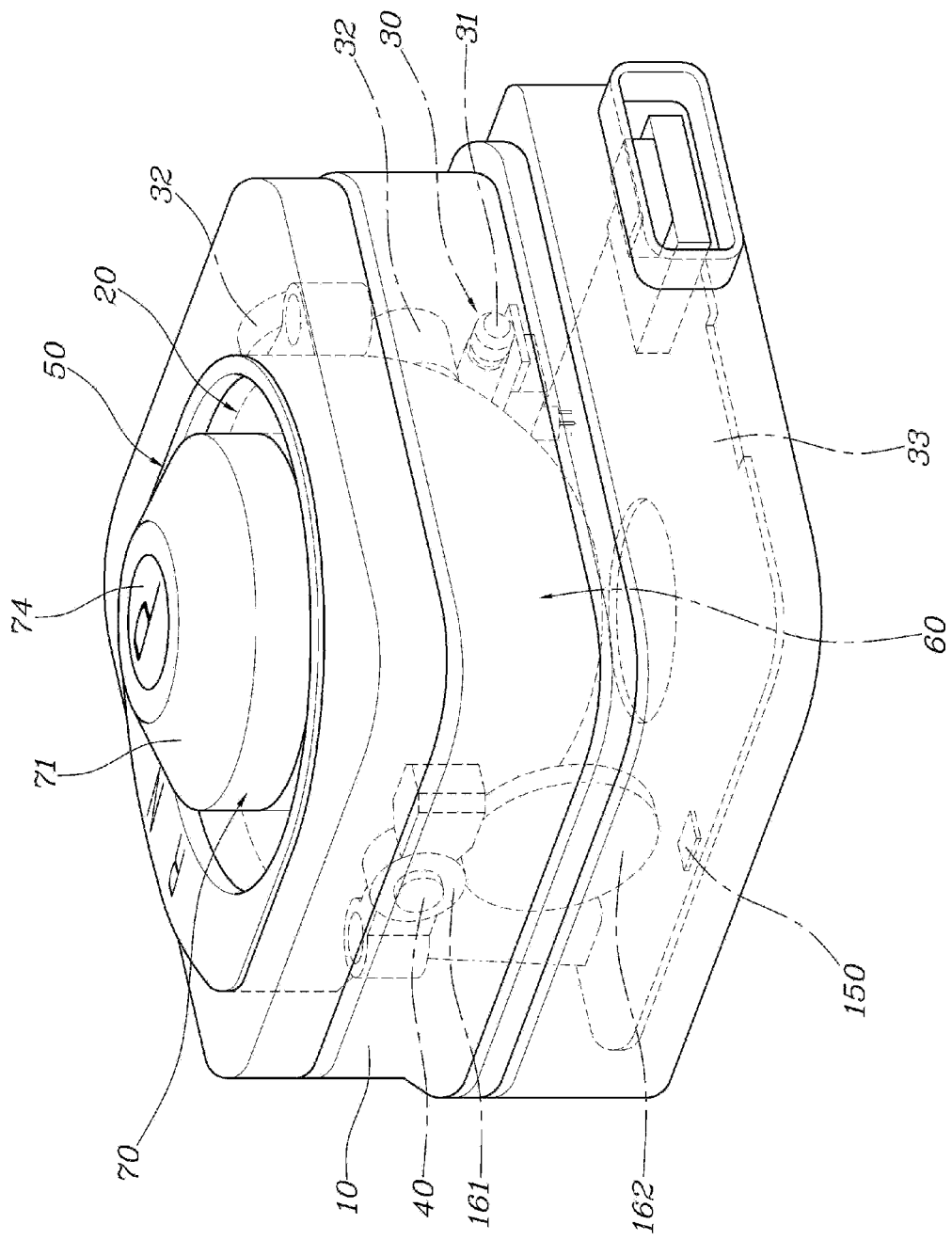
Figure 3:
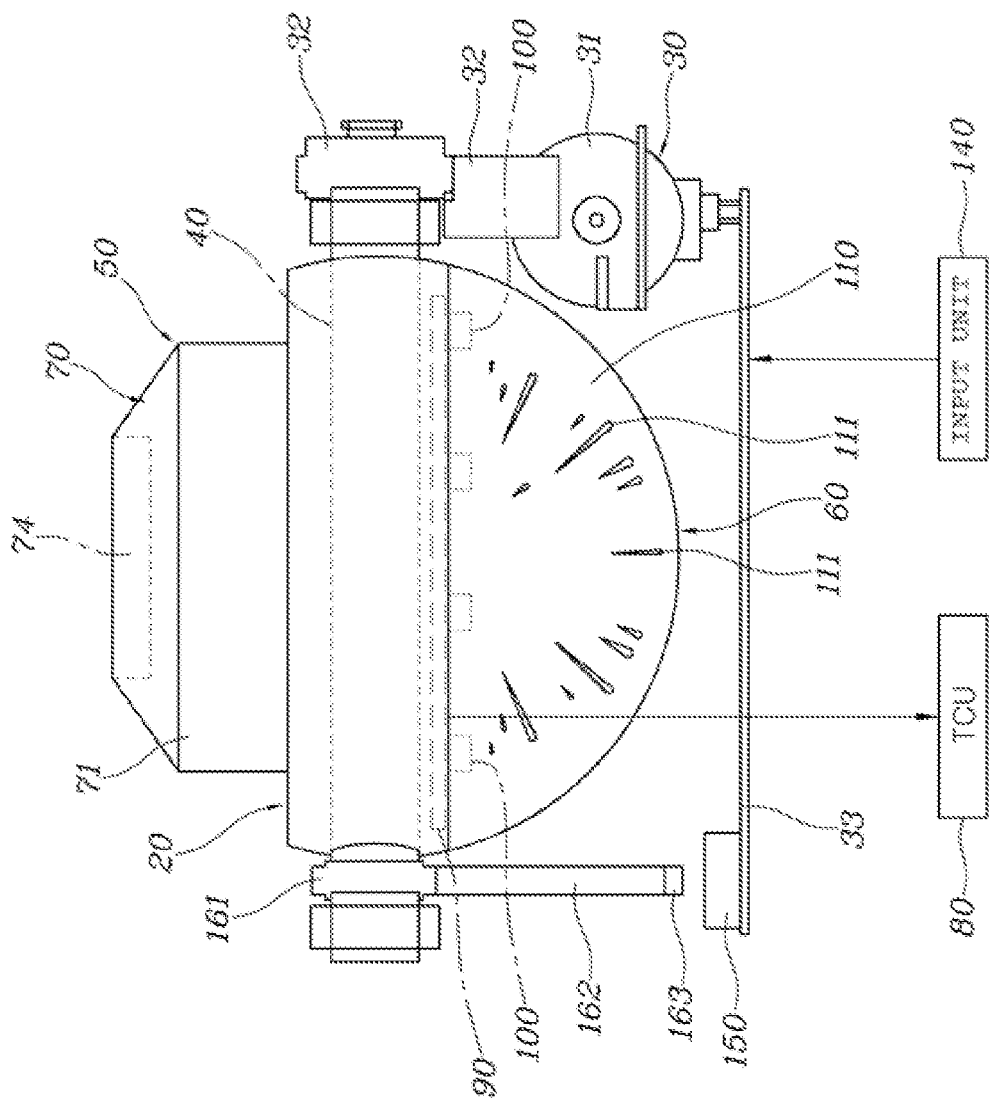
FIG. 3 is a front view illustrating the sphere-type shift control apparatus with a housing removed from FIG. 1.
Figure 4:
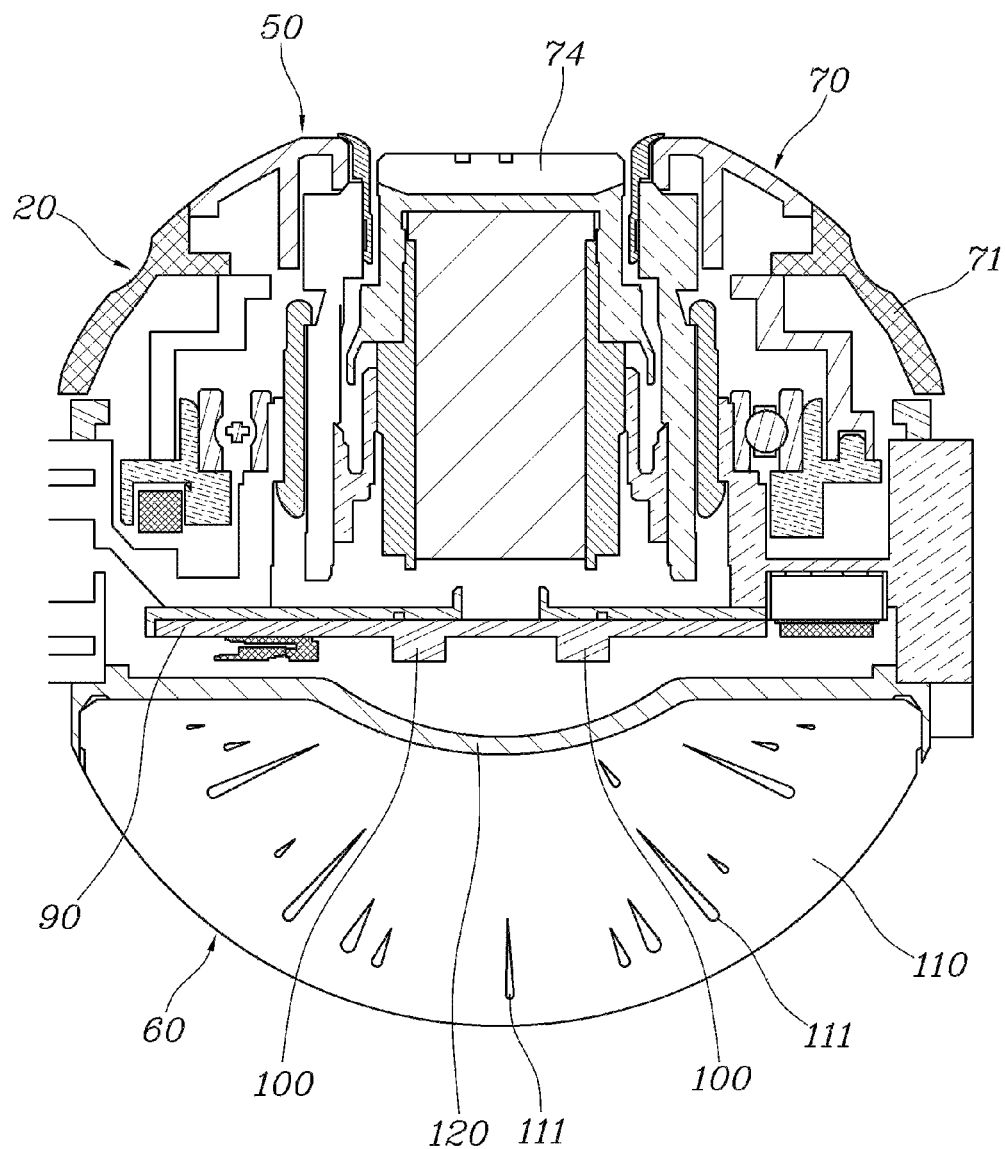
FIG. 4 is a cross-sectional view of FIG. 3.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The specific structural and functional descriptions disclosed in the specification are merely illustrated for the purpose of describing exemplary embodiments of the present disclosure. The present disclosure may be embodied in different forms and should not be construed as limited to the embodiments set forth herein.

The present disclosure may be subjected to various modifications and have various forms, and specific embodiments will be illustrated in the drawings and described in detail in the specification. However, this is not intended to limit the present disclosure to a specific embodiment. It should be understood that the present disclosure includes all modifications, equivalents or replacements that fall within the spirit and technical scope thereof.

The terms such as "first" and/or "second" herein may be used to describe various elements of the present disclosure, but these elements should not be limited by the terms. In other words, such terms will be used only for the purpose of differentiating one element from other elements of the present disclosure. For example, without departing from the scope and spirit of the present disclosure, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. On the other hand, it will be understood that when an element is referred to as being "directly coupled" or "directly connected" to another element, there are no intervening elements present. Other expressions for describing relationships between elements, for example, "between" and "immediately between" or "neighboring" and "directly neighboring" may also be interpreted likewise.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A control unit (controller) according to exemplary embodiments of the present disclosure may be implemented through a processor (not shown) configured to perform the operation described below using an algorithm configured to control the operation of various components of the vehicle or a nonvolatile memory (not shown) configured to store data relating to software instructions for reproducing the algorithm and data stored in that memory. Here, the memory and the processor may be implemented as separate chips. Alternatively, the memory and the processor may be implemented as a single chip integrated with each other. The processor may take the form of one or more processors.

Hereinafter, a sphere-type shift control apparatus for electronic transmission system according to the preferred embodiments of the present disclosure will be described in detail with reference to the accompanying drawings.

As illustrated in FIGS. 1 to 9, the sphere-type shift control apparatus for electronic transmission system according to the present disclosure includes a housing 10, a spherical mechanism 20 rotatably coupled to the housing 10, and a power mechanism 30 that provides rotational power to rotate the spherical mechanism 20 relative to the housing 10.

The housing 10 is located around a driver's seat and is fixedly installed to a console, a center fascia, and the like, which may be reached by a driver's hand.

The spherical mechanism 20 has a rotary shaft 40 coupled through a center of the spherical mechanism 20, and the rotary shaft 40 is rotatable relative to the housing 10.

Thus, when the rotary shaft 40 rotates, the spherical mechanism 20 also rotates relative to the housing 10, in which case a first hemisphere of the spherical mechanism 20 is exposed to a vehicle interior through the housing 10 while a second hemisphere of the spherical mechanism 20 is kept concealed in the housing 10.

The spherical mechanism 20 includes a shift operation unit 50 on the first hemisphere of the spherical mechanism 20 and a design unit 60 on the second hemisphere of the spherical mechanism 20.

When the spherical mechanism 20 is rotated relative to the housing 10, either the shift operation unit 50 or the design unit 60 is exposed to the vehicle interior while the other is kept concealed in the housing 10.

Figure 5:
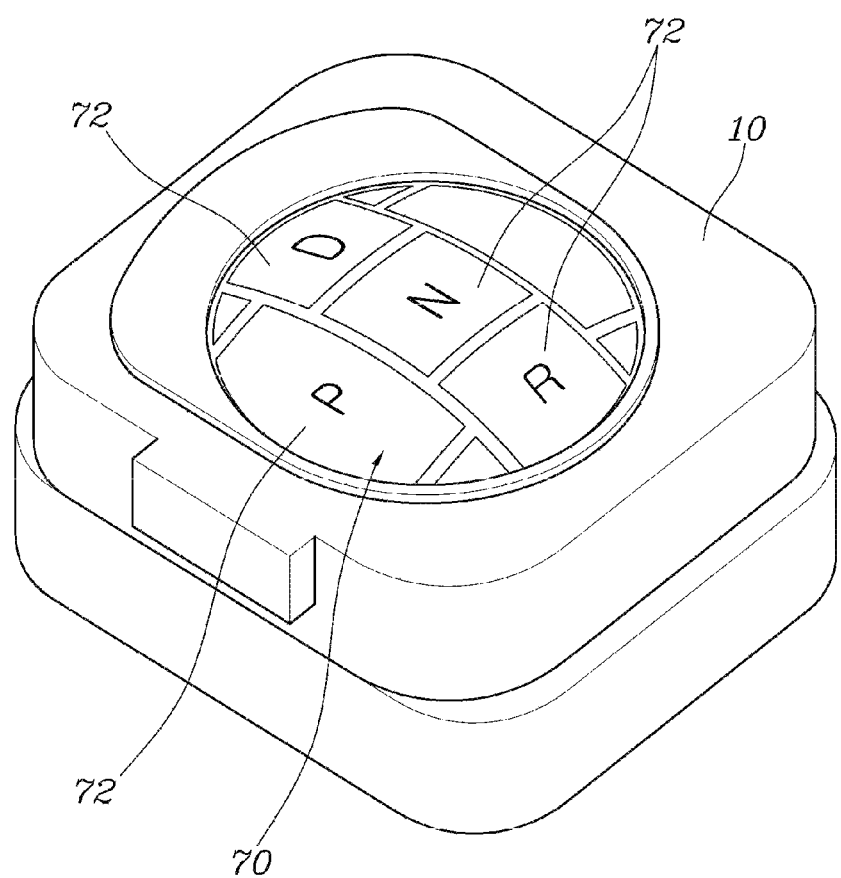
FIGS. 5 to 6 are views illustrating a sphere-type shift control apparatus equipped with a shift button and a shift lever according to another embodiment of the present disclosure.
Figure 6:
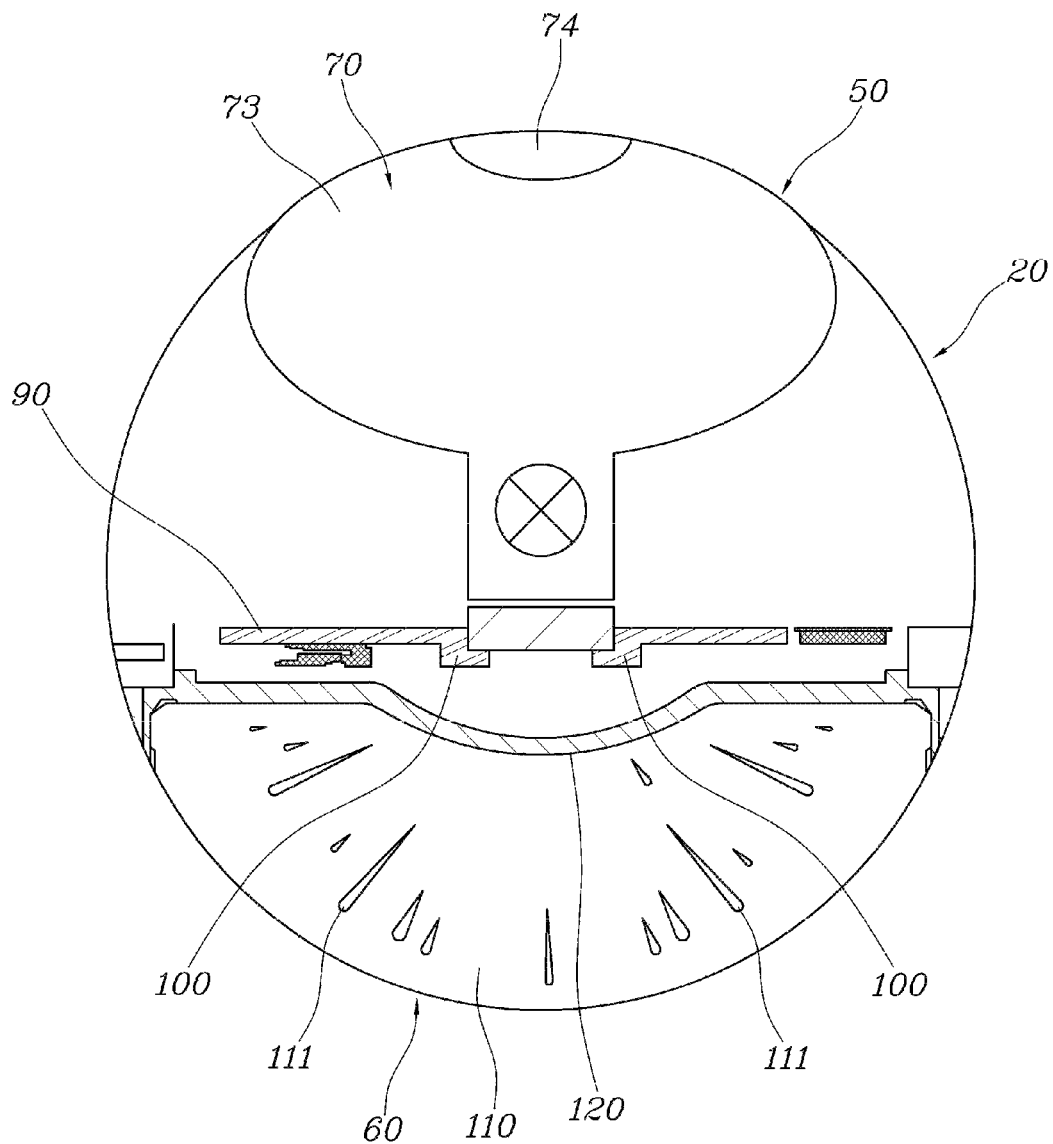

The shift operation unit 50 is provided with a gear shift 70 configured to be operated by the driver of the vehicle (i.e., a person) for gear shifting. The gear shift 70 may be a shift dial 71 as illustrated in FIGS. 1 to 4, or a shift button 72 as illustrated in FIG. 5, or a shift lever 73 as illustrated in FIG. 6.

Here, when the gear shift 70 is the shift dial 71 or the shift lever 73, a separate P-range button 74 may be provided on the gear shift 70.

One of R, N, and D ranges may be selected by operating the shift dial 71, and the separate P-range button 74 is pressed for selection of a P range.

The shift button 72 may be operated in such a manner that the driver selects and presses one of a P-range button, an R-range button, an N-range button, or a D-range button.

The driver may select one of R, N, and D ranges by rotating the shift lever 73, while selecting a P range by pressing a separate P-range button 74.

In an embodiment of the present disclosure, the sphere-type shift control apparatus may further include a first printed circuit board (PCB) 90 that receives an operation signal from the gear shift 70 and outputs a control signal to a transmission control unit (TCU) 80. The first PCB 90 may be fixedly installed in the spherical mechanism 20 to face the gear shift 70.

When receiving an operation signal from the gear shift 70, the first PCB 90 transmits a signal to the transmission control unit 80, so that a transmission actuator operates in response to the signal commanded by the TCU to apply or block a hydraulic pressure with respect to a hydraulic circuit for each shift range, thereby allowing shift control to be electronically performed.

The design unit 60 includes a light source 100, which is coupled to the first PCB 90 and turned on/off by the control of the first PCB 90, and an illumination window 110 having a specific-shaped pattern 111 formed on a surface of the illumination window 110 so as to realize indirect illumination when the light source 100 is turned on.

The light source 100 installed on the first PCB 90 is an LED light source. The light source 100 may realize indirect illumination (mood light, ambient light) when the light source 100 is turned on, and, in particular, may provide a welcome function in response to a user's gesture.

The illumination window 110 may be made of semi-spherical tempered glass, and may be a transparent or a translucent window that transmits light from the light source 100.

The design unit 60 may further include a diffusion member 120 to diffuse light from the light source 100. The diffusion member 120 may be coupled to the illumination window 110 to face the light source 100, and may be a prism as an example.

Figure 8:
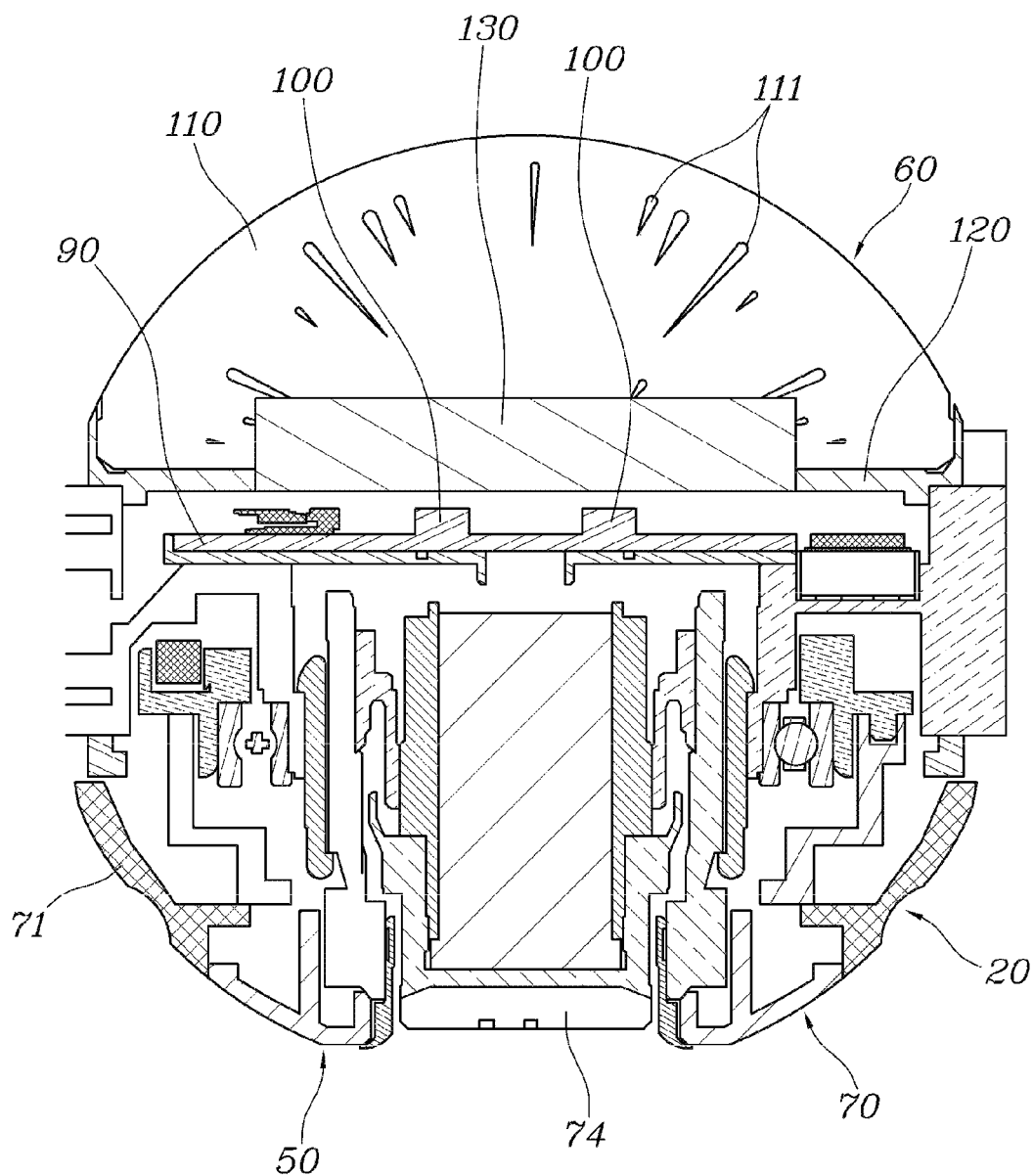

The design unit 60 may further include a display 130 that transmits a specific image through the illumination window 110, as illustrated in FIG. 8.

It is possible to further increase visibility since the image set by a user is transmitted through the display 130.

The display 130 may be fixedly installed on the illumination window 110 or the diffusion member 120, and the operation of the display 130 may be controlled by the first PCB 90.

The power mechanism 30 includes a motor 31 fixedly installed in the housing 10, a plurality of gear members 32 interconnecting the motor 31 and the rotary shaft 40 to transmit power from the motor 31 to the rotary shaft 40, and a second PCB 33 fixed to the housing 10 to control the operation of the motor 31.

When receiving a signal from an input unit, the second PCB 33 controls the motor 31 to be driven. The signal from the input unit 140 may be one of a vehicle ignition on/off signal, a door open/close signal, a door unlock/lock signal, a driving mode change signal (autonomous driving mode and manual driving mode change signal), or an operation switch on/off signal.

When receiving a signal from the input unit 140, the second PCB 33 controls the motor 31 to be driven, and power is transmitted from the motor 31 through the gear members 32 to the rotary shaft 40, so that the rotary shaft 40 is rotated relative to the housing 10 and the spherical mechanism 20 also rotates together with the rotary shaft 40.

Figure 7:
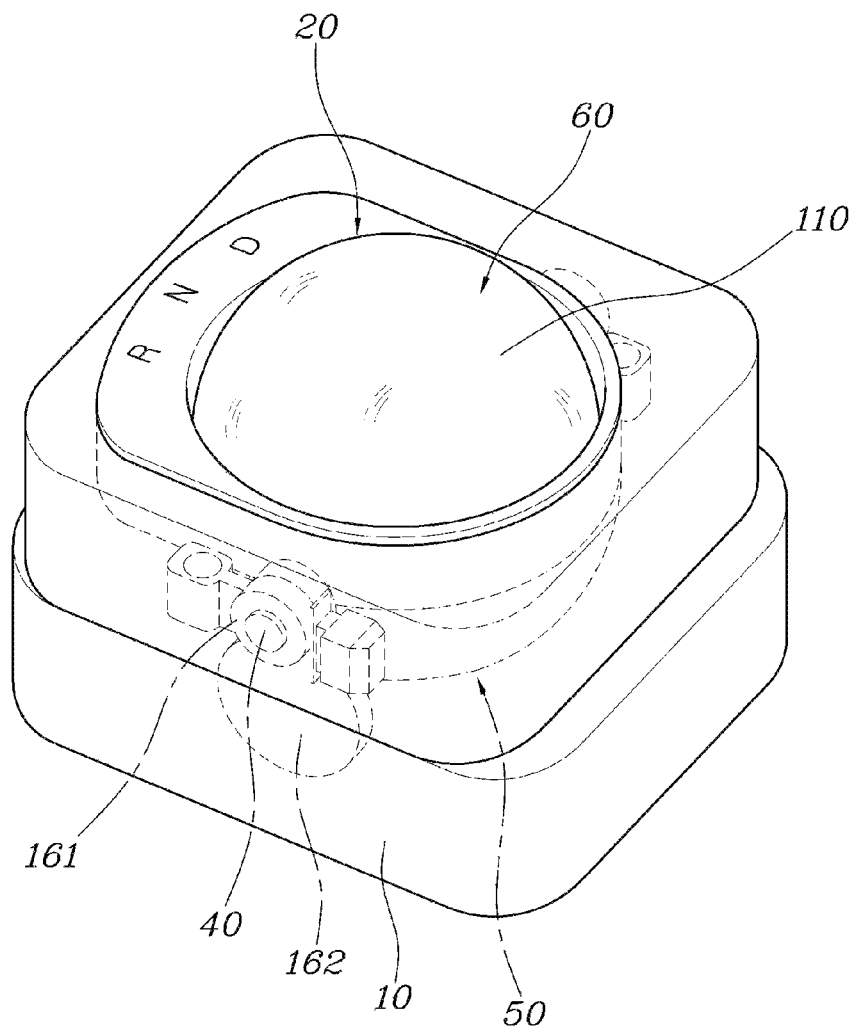
FIGS. 7 and 8 are views illustrating a state in which a spherical mechanism is rotated to expose a design unit.

The spherical mechanism 20 is configured such that the rotary shaft 40 is rotated by 180 degrees when the power mechanism 30 is operated once. Thus, when the spherical mechanism 20 is rotated, the shift operation unit 50 is exposed to the vehicle interior through the opening of the housing 10, as illustrated in FIGS. 1 to 6, or the design unit 60 is exposed to the vehicle interior through the opening of the housing 10, as illustrated in FIGS. 7 and 8.

The second PCB 33 is provided with a hall sensor 150 to detect the rotation of the rotary shaft 40. Therefore, the second PCB 33 may more accurately control the driving of the motor 31 based on the signal from the hall sensor 150.

That is, a first gear 161 is integrally coupled to one end of the rotary shaft 40, the first gear 161 is connected to a second gear 162 in a circumscribed form, the second gear 162 is fixedly installed, at a central axis of the rotary shaft 40, in the housing 10, the second gear 162 is coupled with a permanent magnet 163, the hall sensor 150 is provided in the second PCB 33 to face the permanent magnet 163.

Accordingly, when the first and second gears 161 and 162 are rotated along with the rotation of the rotary shaft 40 and the position of the permanent magnet 163 is changed by the rotation of the second gear 162, the hall sensor 150 may detect a change in magnetic field strength depending on the change in rotational position of the permanent magnet 163, and the second PCB 33 may control the motor 31 so that the driving of the motor 31 is terminated based on the signal from the hall sensor 150.

Figure 9:
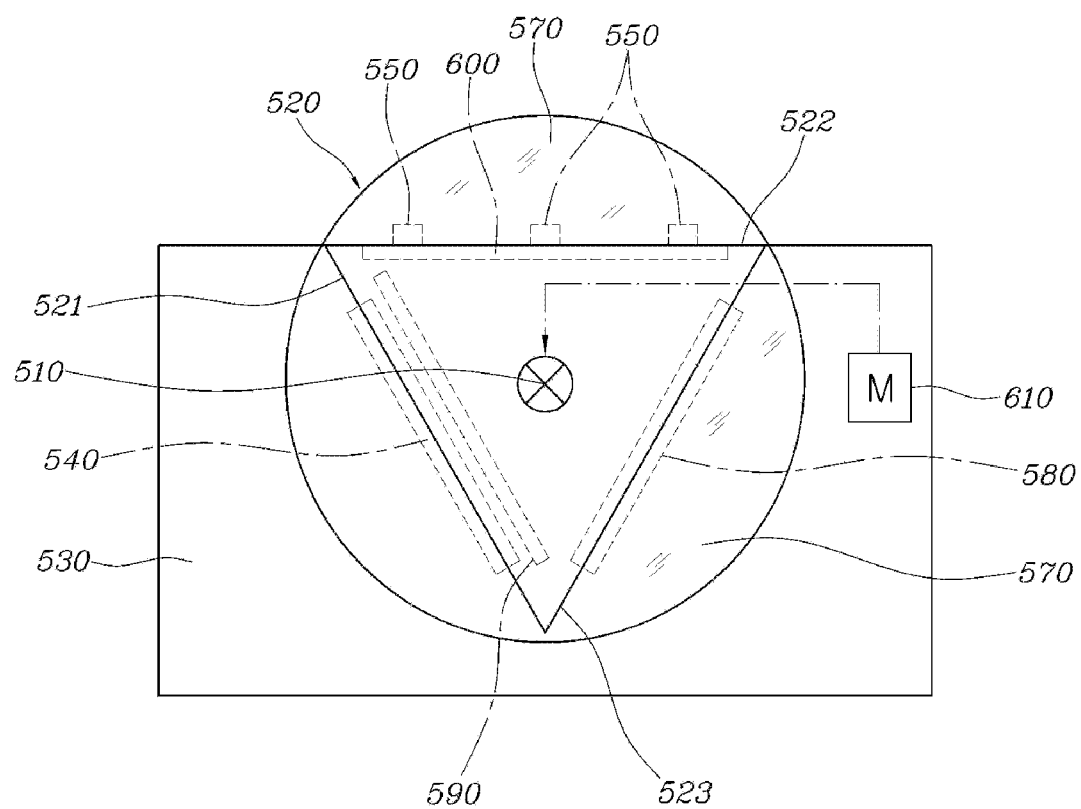
FIG. 9 is a view for explaining a spherical mechanism having three planes according to a further embodiment of the present disclosure.

FIG. 9 illustrates a sphere-type shift control apparatus including a spherical mechanism formed with three planes according to a further embodiment of the present disclosure.

That is, the sphere-type shift control apparatus includes a spherical mechanism 520 having a rotary shaft 510 coupled through a center of the spherical mechanism 520, and a housing 530 to which the spherical mechanism 520 is rotatably coupled via the rotary shaft 510.

The spherical mechanism 520 has a first plane 521, a second plane 522, and a third plane 523 formed on a surface of the spherical mechanism 520, and the first to third planes 521 to 523 are continuously interconnected to form a triangular shape. The spherical mechanism 520 is provided such that the first plane 521 is provided with a gear shift 540 configured to be operated by a driver for gear shifting, the second plane 522 is provided with a light source 550 that realizes indirect illumination, and the third plane 523 is provided with a display 580 that transmits a specific image through an illumination window 570.

The sphere-type shift control apparatus further includes a first PCB 590 that receives an operation signal from the gear shift 540 and outputs a control signal to a transmission control unit (TCU), and a second PCB 600 that controls the light source 550 to be turned on/off and controls the display 580 to be operated.

Both the first PCB 590 and the second PCB 600 are fixedly coupled to the spherical mechanism 520.

The spherical mechanism 520 may be rotated by a power mechanism using the same motor as described above. To this end, the sphere-type shift control apparatus further includes a motor 610, which is fixed to the housing 530 and connected to the rotary shaft 510 to rotate the rotary shaft 510. The driving of the motor 610 may be controlled by either the first PCB 590 or the second PCB 600.

As another example, the spherical mechanism 520 may be rotated about the rotary shaft 510 by the driver's manual operation.

The gear shift 540 may be one of a shift dial, a shift button, or a shift lever.

In the sphere-type shift control apparatus having the above-mentioned configuration, the spherical mechanism 520 is rotated about the rotary shaft 510 by 120 degrees. Thus, when spherical mechanism 520 is rotated, only one of the gear shift 540 provided on the first plane 521, the light source 550 provided on the second plane 522, and the display 580 provided on the third plane 523 is exposed to the vehicle interior through the opening of the housing 530, while the other two are kept concealed in the housing 530.

As described above, the sphere-type shift control apparatus according to the present disclosure is provided such that the shift operation unit 50 configured to be operated by the driver for gear shifting is provided on one hemisphere (e.g., the first hemisphere) of the spherical mechanism 20 and the design unit 60 for indirect illumination and image transmission is provided on the other hemisphere (e.g., the second hemisphere). The sphere-type shift control apparatus is advantageous in that it is possible to enhance stability through an improvement in visual recognition and to improve marketability through high-tech imagery in such a manner that, by rotating the spherical mechanism 20, only the shift operation unit 50 is exposed to the vehicle interior through the opening of the housing 10 when the shift operation is required, while only the design unit 60 is exposed to the vehicle interior through the opening of the housing 10 when the shift operation is not required.

Although the preferred embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A sphere shift control apparatus for an electronic transmission system, comprising:
   a spherical mechanism provided, based on a rotary shaft passing through a center of the spherical mechanism, with a shift operation unit on a first hemisphere of the spherical mechanism and a design unit on a second hemisphere of the spherical mechanism;

a power mechanism configured to rotate the rotary shaft, coupled to the spherical mechanism, relative to a housing; and a first printed circuit board (PCB) coupled to the spherical mechanism;

wherein the rotary shaft is rotated by operation of the power mechanism so that one of the shift operation unit and the design unit is exposed to a vehicle interior and another of the shift operation unit and the design unit is kept concealed in the housing;

wherein the design unit comprises:
a light source coupled to the first PCB and turned on/off by control of the first PCB; and
an illumination window having a specific pattern formed on a surface of the illumination window so as to realize indirect illumination when the light source is turned on.

2. The sphere shift control apparatus according to claim 1, wherein:
the shift operation unit is provided with a gear shift configured to be operated by a driver for gear shifting; and
the gear shift is one of a shift dial, a shift button, or a shift lever.

3. The sphere shift control apparatus according to claim 2, wherein when the gear shift is either the shift dial or the shift lever, a P-range button is provided on the gear shift.

4. The sphere shift control apparatus according to claim 2, wherein the first PCB receives an operation signal from the gear shift and outputs a control signal to a transmission control unit (TCU).

5. The sphere shift control apparatus according to claim 1, wherein the design unit further comprises a diffusion member coupled to the illumination window to face the light source, the diffusion member being configured to diffuse light from the light source.

6. The sphere shift control apparatus according to claim 1, wherein the design unit further comprises a display configured to transmit a specific image through the illumination window.

7. The sphere shift control apparatus according to claim 1, wherein the power mechanism comprises:
a motor fixed to the housing;
a gear member configured to interconnect the motor and the rotary shaft to transmit power from the motor to the rotary shaft; and
a second PCB fixed to the housing to control operation of the motor.

8. The sphere shift control apparatus according to claim 7, wherein:
the second PCB controls the motor to be driven when receiving a signal from an input unit; and
the signal from the input unit is one of a vehicle ignition on/off signal, a door open/close signal, a door unlock/lock signal, a driving mode change signal (autonomous driving mode and manual driving mode change signal), or an operation switch on/off signal.

9. The sphere shift control apparatus according to claim 7, wherein:
the second PCB is provided with a Hall sensor to detect rotation of the rotary shaft; and
the second PCB controls the driving of the motor based on a signal from the Hall sensor.

10. The sphere shift control apparatus according to claim 1, wherein the spherical mechanism is configured such that the rotary shaft is rotated by 180 degrees when the power mechanism is operated once, thereby allowing either the shift operation unit or the design unit to be exposed to the vehicle interior.

11. A sphere shift control apparatus for an electronic transmission system, comprising:
a spherical mechanism provided, based on a rotary shaft passing through a center of the spherical mechanism, with a shift operation unit on a first hemisphere of the spherical mechanism and a design unit on a second hemisphere of the spherical mechanism;
a power mechanism configured to rotate the rotary shaft, coupled to the spherical mechanism, relative to a housing; and
a first printed circuit board (PCB) coupled to the spherical mechanism;
wherein the rotary shaft is rotated by operation of the power mechanism so that one of the shift operation unit and the design unit is exposed to a vehicle interior and another of the shift operation unit and the design unit is kept concealed in the housing;
wherein the design unit comprises:
a light source coupled to the first PCB and turned on/off by control of the first PCB; and
an illumination window made of semi-spherical glass that is transparent or translucent and transmits light from the light source.

12. The sphere shift control apparatus according to claim 11, wherein the design unit further comprises a diffusion member coupled to the illumination window to face the light source, the diffusion member being configured to diffuse light from the light source.

* * * * *